US012580296B2

(12) United States Patent
Nagasaka

(10) Patent No.: US 12,580,296 B2
(45) Date of Patent: Mar. 17, 2026

(54) RESPONDER AND POSITIONING SYSTEM

(71) Applicant: SEIKO EPSON CORPORATION, Tokyo (JP)

(72) Inventor: Kimio Nagasaka, Hokuto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/792,861

(22) Filed: Aug. 2, 2024

(65) Prior Publication Data

US 2025/0046982 A1 Feb. 6, 2025

(30) Foreign Application Priority Data

Aug. 2, 2023 (JP) ................................ 2023-126405

(51) Int. Cl.
*H01Q 1/22* (2006.01)
*H01Q 3/26* (2006.01)
*H01Q 3/42* (2006.01)

(52) U.S. Cl.
CPC ......... *H01Q 1/2208* (2013.01); *H01Q 3/2694* (2013.01); *H01Q 3/42* (2013.01)

(58) Field of Classification Search
CPC ....... H01Q 1/2208–2241; G06K 19/07; G06K 7/10316–10356
See application file for complete search history.

(56) References Cited

U.S. PATENT DOCUMENTS 8,933,787 B2 * 1/2015 Hinman ........... G06K 19/07327 340/10.5
9,846,856 B2 * 12/2017 Rinzler ................. H02J 7/0013

FOREIGN PATENT DOCUMENTS

JP 2007068089 A 3/2007

* cited by examiner

*Primary Examiner* — Hasan Islam
(74) *Attorney, Agent, or Firm* — CHIP LAW GROUP

(57) ABSTRACT

A responder that receives an interrogation wave from an interrogator and transmits a response wave to the interrogator, includes at least one antenna receiving the interrogation wave, a time-series information converter measuring a quadrature phase amplitude of the interrogation wave received by the antenna and converting the quadrature phase amplitude into time-series information, a memory storing the time-series information, and a transmission controller controlling to transmit the response wave from the antenna based on the time-series information stored in the memory, wherein the transmission controller reads out the time-series information in an order reverse to an order of the storage in the memory and generates the response wave.

6 Claims, 6 Drawing Sheets

RESPONDER AND POSITIONING SYSTEM

The present application is based on, and claims priority from JP Application Serial Number 2023-126405, filed Aug. 2, 2023, the disclosure of which is hereby incorporated by reference herein in its entirety.

BACKGROUND

1. Technical Field

The present disclosure relates to a responder and a positioning system.

2. Related Art

In related art, various responders that receive interrogation waves from interrogators and transmit response waves to the interrogators are used. For example, JP-A-2007-68089 discloses a responder that communicates with an interrogator in a retrodirective manner. In the responder of JP-A-2007-68089, a reception IF signal obtained by down-conversion of a reception RF signal as a reception wave is input to a carrier wave regenerator and a carrier wave is generated, and a transmission IF signal as a response wave is generated by a modulator using the generated carrier wave. Here, a relationship between a frequency $\omega_{RFr}$ of the transmission IF signal and a frequency $\omega_{RFt}$ of the reception RF signal is $\omega_{RFr}=-\omega_{RFt}$. That is, a conjugate wave of the carrier wave, that is, a radio wave traveling in a direction opposite to the arrival direction of the reception wave can be generated. Thereby, communication in the retrodirective method is realized between the interrogator and the responder.

JP-A-2007-68089 is an example of the related art.

However, in the responder disclosed in JP-A-2007-68089, when the interrogation wave from the interrogator is received, if an object reflecting the interrogation wave is present in the path, a delay spread may be caused due to an influence of multipath, the reception waveform may become dull, and the reception accuracy may be affected. In addition, in a general responder in the related art, since the signals are returned while the order of the received signals is maintained, for example, a component corresponding to a direct wave of the signal transmitted later may be returned to the transmitter earlier than a reflected wave of the signal transmitted earlier due to multipath.

SUMMARY

According to an aspect of the present disclosure, there is provided a responder that receives an interrogation wave from an interrogator and transmits a response wave to the interrogator, including at least one antenna receiving the interrogation wave, a time-series information converter measuring a quadrature phase amplitude of the interrogation wave received by the antenna and converting the quadrature phase amplitude into time-series information, storing a memory the time-series information, and a transmission controller controlling to transmit the response wave from the antenna based on the time-series information stored in the memory, wherein the transmission controller reads out the time-series information in an order reverse to an order of the storage in the memory and generates the response wave.

DESCRIPTION OF EMBODIMENTS

Figure 1:
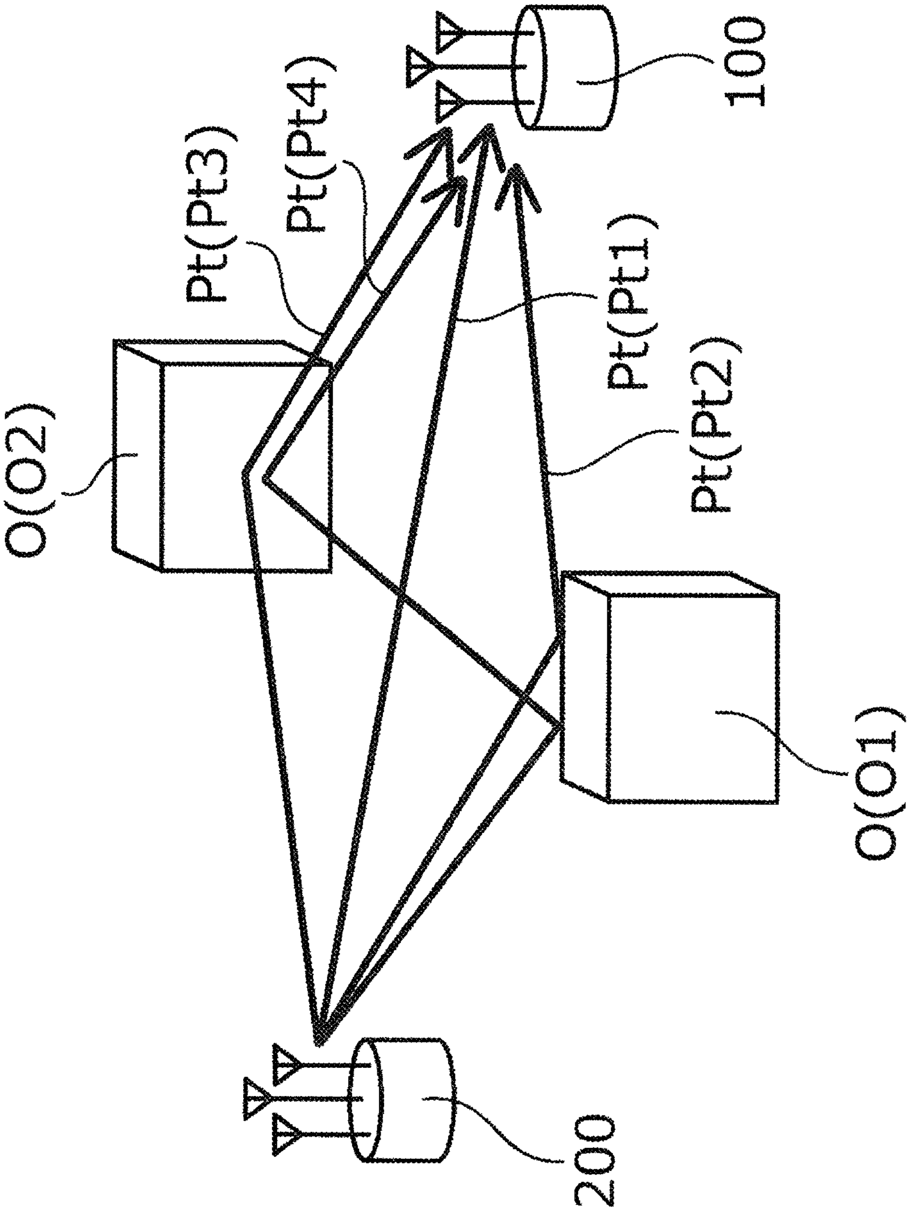
FIG. 1 shows a usage example of a responder according to one embodiment of the present disclosure.

First, the present disclosure will be schematically described.

A responder in a first aspect of the present disclosure for solving the above problem is a responder that receives an interrogation wave from an interrogator and transmits a response wave to the interrogator, including at least one antenna receiving the interrogation wave, a time-series information converter measuring a quadrature phase amplitude of the interrogation wave received by the antenna and converting the quadrature phase amplitude into time-series information, a memory storing the time-series information, and a transmission controller controlling to transmit the response wave from the antenna based on the time-series information stored in the memory, wherein the transmission controller reads out the time-series information in an order reverse to an order of the storage in the memory and generates the response wave.

According to this aspect, the time-series information is read out in the reverse order to the order of the time-series information of the interrogation wave stored in the memory, and the response wave is generated. That is, the time-reversed wave of the received interrogation wave is transmitted as the response wave. Accordingly, the path of the response wave is aligned with the path of the interrogation wave and the time-reversed wave of the interrogation wave is transmitted as the response wave, and thereby, the interrogator may receive the response wave with the suppressed influence of multipath.

The responder in a second aspect of the present disclosure according to the first aspect includes a reception time calculator determining a reference time as a time when the antenna receives a specific signal pattern contained in the interrogation wave based on the time-series information stored in the memory, wherein the transmission controller controls to transmit the response wave after a lapse of a predetermined holding time from the reference time.

According to the mode, the response wave is transmitted after the lapse of the predetermined holding time from the reference time as the time when the antenna receives the specific signal pattern contained in the interrogation wave. Therefore, the response wave to the interrogation wave can be preferably transmitted from, for example, a specific responder of a plurality of responders.

The responder in a third aspect of the present disclosure according to the first aspect includes a plurality of the antennas, wherein the antennas are arranged at predetermined intervals along a receiving surface of the responder.

According to the mode, the antennas are arranged at the predetermined intervals along the receiving surface of the responder. Therefore, the transmission direction of the interrogation wave may be grasped based on the reception order of the interrogation waves of the array of the antennas.

In the responder in a fourth aspect of the present disclosure according to the first mode, the time-series information converter includes a modem having a first bidirectional mixer, a second bidirectional mixer, and a bidirectional amplifier coupled to the antenna, the first bidirectional mixer, and the second bidirectional mixer, a reference signal generator having a shifter shifting a phase by $\pi/2$ and a local oscillator coupled to the first bidirectional mixer and coupled to the second bidirectional mixer via the shifter, an A/D and D/A converter coupled to the first bidirectional mixer and the second bidirectional mixer, and a frequency divider coupled to the A/D and D/A converter.

According to the mode, the time-series information converter includes the modem having the first bidirectional mixer, the second bidirectional mixer, and the bidirectional amplifier coupled to the antenna, the first bidirectional mixer, and the second bidirectional mixer, the reference signal generator having the shifter shifting a phase by $\pi/2$ and the local oscillator coupled to the first bidirectional mixer and coupled to the second bidirectional mixer via the shifter, the A/D and D/A converter coupled to the first bidirectional mixer and the second bidirectional mixer, and the frequency divider coupled to the A/D and D/A converter. According to the configuration, the quadrature phase amplitude of the interrogation wave can be preferably converted into time-series information.

A positioning system in a fifth aspect of the present disclosure includes the responder according to any one of the first to fourth modes, the interrogator, a distance calculator calculating a distance from the interrogator to the responder, and a position detector measuring a position of the responder, wherein the interrogator outputs the interrogation wave containing a specific signal pattern, the distance calculator calculates the distance from the interrogator to the responder based on a difference between a time when the interrogation wave is transmitted from the interrogator and a time when the response wave transmitted from the responder is received by the interrogator and a predetermined holding time, and the position detector measures the position of the responder based on the distance.

According to the mode, the interrogator outputs the interrogation wave containing the specific signal pattern, the distance calculator calculates the distance from the interrogator to the responder based on the difference between the time when the interrogation wave is transmitted from the interrogator and the time when the response wave transmitted from the responder is received by the interrogator and the predetermined holding time, and the position detector measures the position of the responder based on the distance. According to the configuration, the position of the responder can be accurately measured.

The positioning system in a sixth aspect of the present disclosure according to the fifth aspect includes a mechanical body having a movable part and a fixed part, wherein the interrogator is provided in the fixed part, and the responder is provided in the movable part.

According to the mode, the interrogator is provided in the fixed part, and the responder is provided in the movable part. According to the configuration, the position of the responder provided in the movable part can be accurately measured.

As below, embodiments according to the present disclosure will be described with reference to the accompanying drawings. A responder 100 of the present disclosure is a responder that receives an interrogation wave Pt from an interrogator 200 and transmits a response wave Pr to the interrogator 200 (see FIG. 2). First, a usage example of the responder 100 according to one embodiment of the present disclosure will be described with reference to FIG. 1.

As shown in FIG. 1, when receiving the interrogation wave Pt from the interrogator 200, the responder 100 receives a direct wave directly reaching the responder 100 from the interrogator 200 and a reflected wave reflected by an object O and reaching the responder 100 from the interrogator 200. In FIG. 1, the direct wave is referred to as a direct wave Pt1, the reflected wave reflected only by an object O1 and reaching of the reflected waves is referred to as a reflected wave Pt2, the reflected wave reflected only by an object O2 and reaching of the reflected waves is referred to as a reflected wave Pt3, and the reflected wave reflected by the object O1 and the object O2 and reaching of the reflected waves is referred to as a reflected wave Pt4.

Generally, a reflected wave transmitted from the interrogator 200 reaches the responder 100 later than a direct wave. Further, the same applies to a case where the interrogator 200 receives the response wave Pr returned from the responder 100 to the interrogator 200. For this reason, when radio waves propagated through different paths reach at different times, in other words, when a component of a direct wave and a component of a reflected wave are mixed, a reception waveform may become dull and an influence of the so-called multipath may be caused. In order to suppress the influence of multipath, there is a method of, in addition to reversing signs of carrier wave frequencies of the interrogation wave Pt and the response wave Pr to each other, generating and transmitting a time-reversed wave as a conjugate wave obtained by completely time-reversal of the phase and the complex amplitude of the received radio wave changing in time series.

Figure 2:
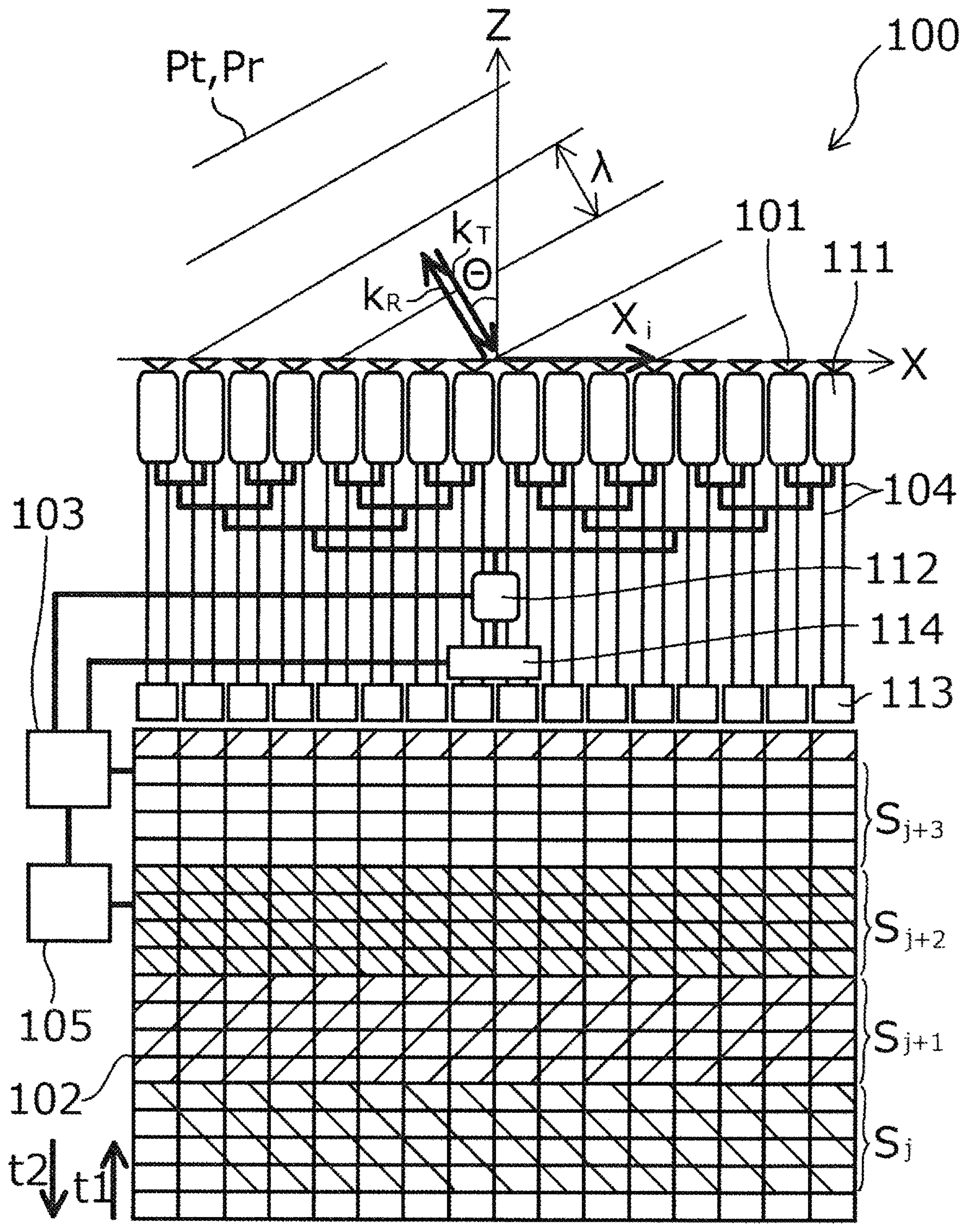
FIG. 2 shows a configuration of the responder according to the one embodiment of the present disclosure.

As below, the details of the responder 100 according to the one embodiment of the present disclosure will be described with reference to FIGS. 2 to 4. First, an operation when the responder 100 receives the interrogation wave Pt will be described together with a configuration of the responder 100 with reference to FIG. 2. FIG. 2 shows both a state in which the interrogation wave Pt having a wavelength $\lambda$ is received by the responder 100 and a state in which the response wave Pr having the wavelength $\lambda$ is transmitted from the responder 100. Specifically, a state in which, using the responder 100 having an array antenna in which receiving surfaces of antennas 101 are arranged in a planar shape in an X direction and a Y direction orthogonal to the X direction in FIG. 2, the interrogation wave Pt is received by the responder 100 from a direction inclined by an angle $\theta$ with respect to a Z direction in FIG. 2 orthogonal to the receiving surfaces of the antennas 101 and the response wave Pr is transmitted from the responder 100 in a direction opposite to the reception direction is shown.

The interrogation wave Pt is, for example, a radio wave (electromagnetic wave) having a waveform obtained by modulation of various kinds of information including ID (IDENTIFICATION) information as an identification number for identifying the responder 100 to receive and synchronization information by an appropriate method. For the modulation method, phase modulation, amplitude modulation, quadrature frequency division multiplexing, or the like can be selected. For the carrier waves as the interrogation wave Pt and the response wave Pr, microwaves, millimeter waves, terahertz waves, or the like can be used.

The antenna 101 has a function of receiving the interrogation wave Pt, and a plurality of the antennas are arranged in one dimension (for example, in the X direction in FIG. 2) or two dimensions (for example, the X direction and the Y direction intersecting the X direction in FIG. 2) at regular intervals to form the array antenna. Although the responder 100 of the embodiment has the array antenna in which the antennas 101 are two-dimensionally arranged, the interrogation wave Pt and the response wave Pr inclined only in the X direction with respect to the Z direction are considered in FIG. 2 for simplification of description. Here, generally, the array antenna is mounted as an array of patch antennas on a substrate and an electric field amplitude distribution $A_T$ ($x_i$, t) which vibrates on a surface of the array antenna can be expressed by the following equation (1).

$$A_T(x_i, t) = A_0\sin(k_T \cdot x_i - \omega t + \phi) \tag{1}$$

Here, $k_T$ is a wave number vector of the interrogation wave Pt. $X_i$ is a vector indicating the position of the i-th antenna from the coordinate axis origin. ω is a carrier wave angular frequency of the interrogation wave Pt. A phase difference φ is a difference between the phase of the interrogation wave Pt and the phase of an LO signal as a signal output by a local oscillator 112*b*, which will be described later, in positions in bidirectional mixers 111*b* and 111*c*. When the phase of the interrogation wave Pt is modulated, the phase difference φ contains the modulated phase. Although polarization dependency is not particularly mentioned here, a dual polarized antenna capable of independently receiving polarization components in two orthogonal directions can also be used as necessary.

Figure 3:
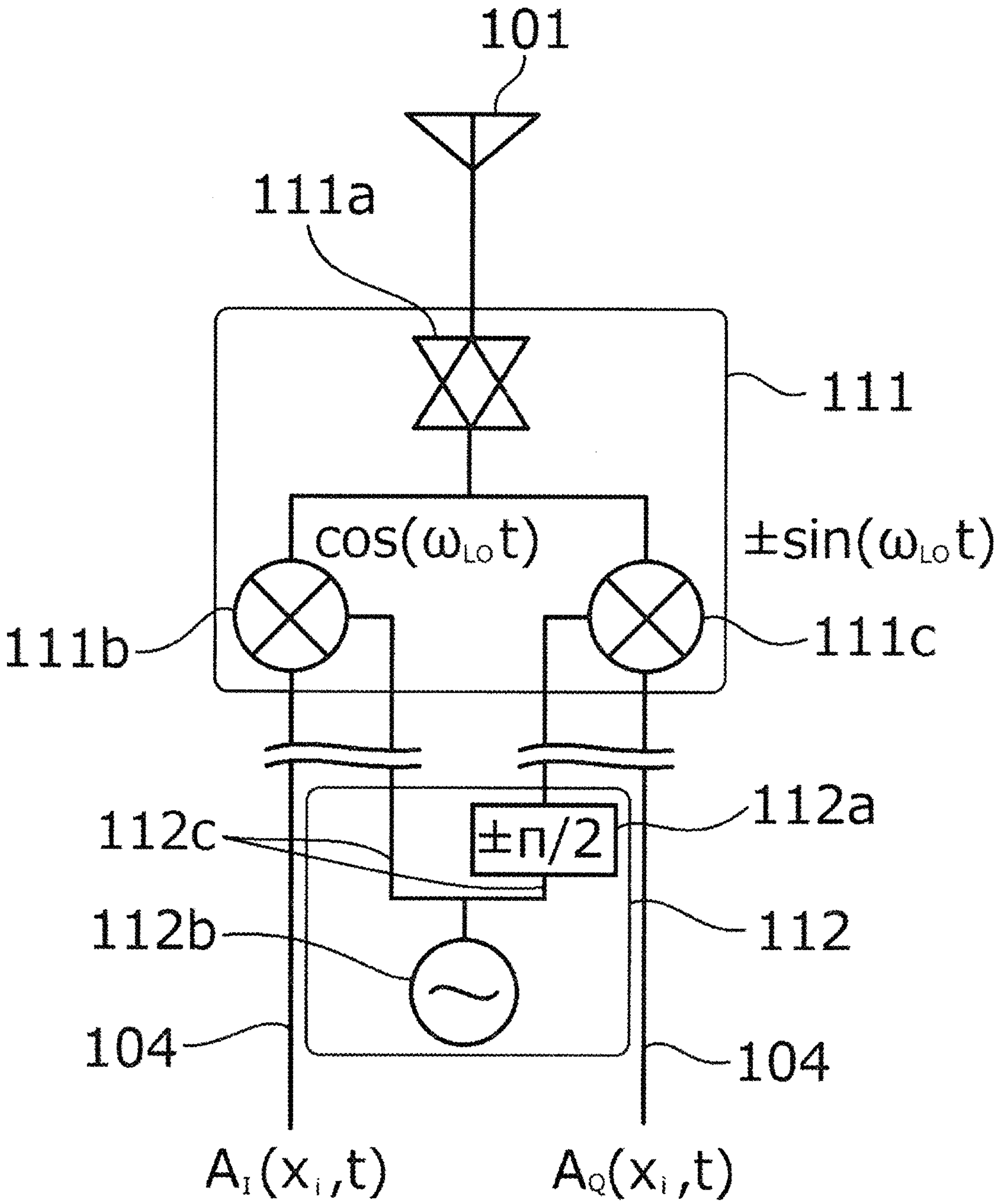
FIG. 3 shows a modem and a reference signal generator of the responder shown in FIG. 2.
Figure 4:
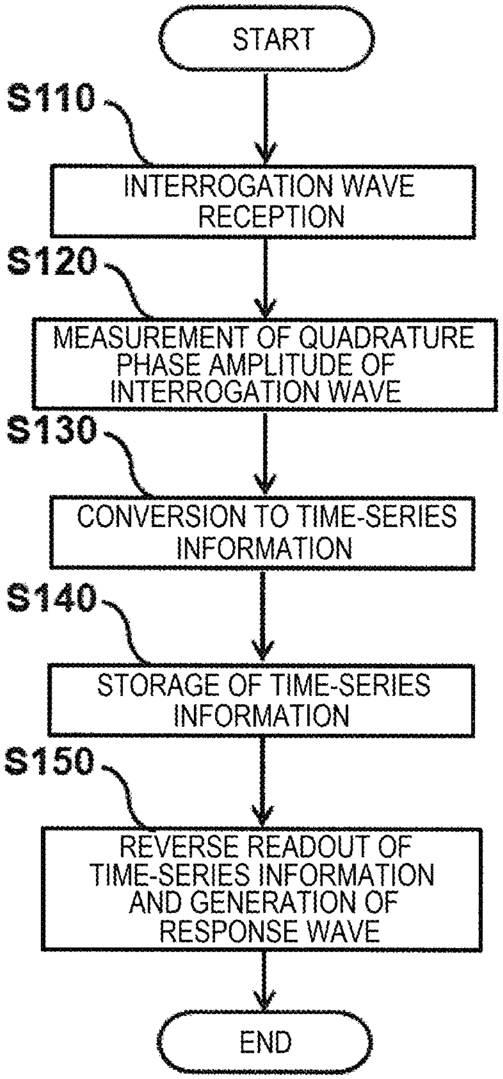
FIG. 4 is a flowchart showing a generation process of a response wave in the responder in FIG. 2.

As shown in FIGS. 2 and 3, modems 111 are respectively coupled to the individual antennas 101. As shown in FIG. 3, the modem 111 includes a bidirectional amplifier 111*a* and the bidirectional mixers 111*b* and 111*c*. The modem 111 amplifies an electric signal output from the antenna 101 by the bidirectional amplifier 111*a*, and then branches and inputs the electric signal to the bidirectional mixers 111*b* and 111*c*. The bidirectional mixers 111*b* and 111*c* are coupled to paths 104 as shown in FIG. 3, and the paths 104 are coupled to an A/D and D/A converter 113 as shown in FIG. 2.

As shown in FIG. 3, a reference signal generator 112 includes the local oscillator 112*b* and a ±π/2 shifter 112*a*. The local oscillator 112*b* oscillates at a frequency $\omega_{LO}$ equal to the carrier wave frequency ω of the interrogation wave Pt, and branches into two transmission lines 112*c*. One becomes an LO signal having an In-phase phase as it is, and the other becomes an LO signal having a quadrature phase delayed by a phase π/2 by the ±π/2 shifter 112*a*. The subsequent lines are coupled by wires having an equal length so as not to generate a phase difference, and the signals are distributed to all the bidirectional mixers (bidirectional mixers 111*b* and 111*c*).

According to the configuration, quadrature demodulation at the same phase is performed in all the bidirectional mixers, and an amplitude $A_I$($x_i$, t) and an amplitude $A_Q$($x_i$, t) of two orthogonal phase components are output as baseband signals. Hereinafter, a combination of the amplitudes is referred to as "quadrature phase amplitude". This function is shown using the following equations (2) and (3). In the following equations (2) and (3), the terms containing $\omega_{LO}$ are removed by a filter or the like (not shown) in the actual operation, and only the terms not containing $\omega_{LO}$ remain and are input to the A/D converter (A/D and D/A converter 113).

$$\begin{aligned} A_I(x_i, t) &= A_0\sin(k_T \cdot x_i - \omega t + \phi)\cos(\omega_{LO}t) \\ &= \frac{A_0}{2}(\sin(k_T \cdot x_i + \phi) - \sin(-k_T \cdot x_i + 2\omega_{LO}t - \phi)) \\ &\cong \frac{A_0}{2}\sin(k_T \cdot x_i + \phi) \end{aligned} \tag{2}$$

$$\begin{aligned} A_Q(x_i, t) &= A_0\sin(k_T \cdot x_i - \omega t + \phi)\sin(\omega_{LO}t) \\ &= \frac{A_0}{2}(\cos(k_T \cdot x_i + \phi) - \cos(-k_T \cdot x_i + 2\omega_{LO}t - \phi)) \\ &\cong \frac{A_0}{2}\cos(k_T \cdot x_i + \phi) \end{aligned} \tag{3}$$

Here, the A/D converter (A/D and D/A converter 113) performs A/D conversion on the baseband signal in synchronization with a frequency-divided signal of the LO signal divided by a frequency divider 114 coupled to the A/D and D/A converter 113 as shown in FIG. 2, and outputs the signal to a memory 102 shown in FIG. 2. The memory 102 increments a write address in synchronization with the frequency-divided signal, and records the signals output from the A/D converters (A/D and D/A converters 113) as quadrature phase amplitude data in chronological order.

A reception time calculator 105 shown in FIG. 2 monitors a pattern of data in the memory 102. Then, for example, when the interrogation wave Pt is added with the identification number of the responder 100 as a target by phase modulation or the like and transmitted, the data of symbols $S_j$ to $S_{j+3}$ in FIG. 2 is stored in the memory 102. Here, when the identification number of the transmitted wave interrogation Pt matches the identification number of its own, the responder 100 simultaneously transmits a trigger signal to the transmission controller shown in FIG. 2.

When detecting the trigger signal, the transmission controller 103 inverts the sign in the ±π/2 shifter 112*a* of the reference signal generator 112, and generates a conjugate LO signal as a time-reversed LO signal. Note that, when expressed by an IQ plane as a plane formed by an In-phase axis and a Quadrature axis, a wave rotates in a direction opposite to that at the time of reception. At the same time, the read address of the memory 102 is decremented in a direction (t2 direction in FIG. 2) opposite to the write direction (t1 direction in FIG. 2), and the quadrature phase amplitude data is sequentially read and output to the D/A converters (A/D and D/A converters 113).

The D/A converter (A/D and D/A converter 113) converts the time-series data into an analog signal and outputs the analog signal to the modem 111. The modem 111 mixes the output from the D/A converter (A/D and D/A converter 113) with the conjugate LO signal, outputs the mixed signal to the antenna 101 through the bidirectional amplifier 111*a*, and returns the response wave Pr to the interrogator 200. Here, the electric field amplitude distribution $A_R$($x_i$, t) when the response wave Pr is generated can be expressed by the following equation (4) using quadrature phase amplitudes $A_I$($x_i$, t) and $A_Q$($x_i$, t).

$$A_R(x_i, t) = \frac{A_0}{2}\sin(k_T\cdot x_i+\phi)\cos(\omega_{LO}t) + \frac{A_0}{2}\cos(k_T\cdot x_i+\phi)\sin(\omega_{LO}t) \tag{4}$$
$$= \frac{A_0}{2}[\sin(k_T\cdot x_i+\omega_{LO}t+\phi)+\sin(k_T\cdot x_i-\omega_{LO}t+\phi)] + \frac{A_0}{2}[\sin(k_T\cdot x_i+\omega_{LO}t+\phi)-\sin(k_T\cdot x_i-\omega_{LO}t+\phi)]$$
$$= A_0\sin(k_T\cdot x_i+\omega_{LO}t+\phi)$$
$$= -A_0\sin(k_R\cdot x_i-\omega_{LO}t-\phi)$$

Here, the sign of the quadrature component sin ($\omega_{LO}$t) of the LO signal is inverted by the sign inversion in the ±π/2 shifter 112*a*. As a result of the series of processing, as shown in FIG. 2, the wave number vector $k_R$ of the output response wave Pr propagates in the opposite direction to the wave number vector $k_T$ at the reception of the interrogation wave Pt.

Strictly, when the equation (1) and the equation (4) are compared, a phase difference of 2φ is generated, and an error occurs in a holding time (holding time $t_h$) from the reception completion time of the interrogation wave Pt to the transmission start time of the response wave Pr. When there is a request to correct this, a method of adjusting and correcting the data of the quadrature phase amplitude stored in the memory 102 is conceivable. Alternatively, a phase shifter may be provided immediate downstream of the output of the local oscillator 112*b* for correction. The generated response wave Pr is divided into a plurality of paths 104, and each propagates in the opposite direction to that of the interrogation wave Pt, that is, oppositely in the same path, and the waves are delayed by an equal time in an outward route and a return route, and as a result, the waves reach the interrogator 200 at the same time. Accordingly, the response wave Pr with the suppressed delay spread can be acquired by the interrogator 200.

Note that, in the embodiment, the quadrature component obtained by mixing from the interrogation wave Pt is stored in the memory 102 as it is, however, the component may be inverted in sign and stored instead. In this case, the sign of the ±π/2 shifter 112*a* is not inverted, and the quadrature component with the inverted sign is read and the response wave Pr is generated. According to the method, the equation (4) is equivalent, and substantially the same effect as that of the embodiment can be obtained.

As described above, the responder 100 of the embodiment that receives the interrogation wave Pt from the interrogator 200 and transmits the response wave Pr to the interrogator 200 includes the plurality of antennas 101 receiving the interrogation wave Pt. In the responder 100 of the embodiment, the modems 111, the reference signal generator 112, the A/D and D/A converters 113, and the frequency divider 114 coupled to the A/D and D/A converters form a time-series information converter. The time-series information converter measures the quadrature phase amplitude of the interrogation wave Pt received by the antenna 101 and converts the quadrature phase amplitude into time-series information.

Further, as described above, the responder 100 of the embodiment includes the memory 102 storing the time-series information, and the transmission controller 103 controlling to transmit the response wave Pr from the antenna 101 based on the time-series information stored in the memory 102. Furthermore, as described above, the transmission controller 103 reads out the time-series information in the order opposite to the order of the storage in the memory 102 and generates the response wave Pr. According to the configuration, the responder 100 of the embodiment transmits the time-reversed wave of the received interrogation wave Pt as the response wave Pr. Accordingly, the responder 100 of the embodiment aligns the path of the response wave Pr with the path of the interrogation wave Pt and transmits the time-reversed wave of the interrogation wave Pt as the response wave Pr, and thereby, the interrogator 200 may receive the response wave Pr with the suppressed influence of multipath.

Here, the generation process of the response wave Pr in the responder 100 of the embodiment will be described as below with reference to a flowchart in FIG. 4. First, at step S110, the responder 100 receives the interrogation wave Pt by the antenna 101. Then, the time-series information converter measures the quadrature phase amplitude of the interrogation wave Pt at step S120, and converts the quadrature phase amplitude into the time-series information at step S130. Then, at step S140, the time-series information is stored in the memory 102. Then, at step S150, under control of the transmission controller 103, the time-series information is read out in the reverse order to the order of the storage in the memory 102 and the response wave Pr is generated.

As described above, responder 100 of the embodiment includes the plurality of antennas 101. In the responder 100 of the embodiment, the plurality of antennas 101 are arranged at predetermined intervals along the receiving surface of the responder 100. According to the configuration, the responder 100 of the embodiment can grasp the transmission direction of the interrogation wave Pt by the reception order of the interrogation waves Pt of the array of the antennas 101. The transmission direction of the interrogation wave Pt is grasped, and thereby, the response waves Pr can be transmitted in the reverse order to the reception order of the interrogation waves Pt. However, the configuration is not limited thereto. For example, in a configuration having a directional antenna as the antenna 101, at least one antenna 101 may be provided.

As shown in FIG. 3, in the responder 100 of the embodiment, the time-series information converter includes the modem 111 having the bidirectional mixer 111*b* as a first bidirectional mixer, the bidirectional mixer 111*c* as a second bidirectional mixer, and the bidirectional amplifier 111*a* coupled to the antenna 101 and the bidirectional mixers 111*b* and 111*c*. Further, the time-series information converter includes the reference signal generator 112 having the ±π/2 shifter 112*a* as a shifter that shifts the phase by π/2, and the local oscillator 112*b* coupled to the bidirectional mixer 111*b* and coupled to the bidirectional mixer 111*c* via the ±π/2 shifter 112*a*. Furthermore, the time-series information converter includes the A/D and D/A converter 113 coupled to the bidirectional mixers 111*b* and 111*c*, and the frequency divider 114 coupled to the A/D and D/A converter 113. According to the configuration, the quadrature phase amplitude of the interrogation wave Pt can be preferably converted into the time-series information.

As shown in FIG. 2, the responder 100 of the embodiment includes the reception time calculator 105 determining a reference time as a time when the antenna 101 receives a specific signal pattern contained in the interrogation wave Pt including the identification number or the like based on the time-series information stored in the memory 102. Here, the transmission controller 103 is configured to control to transmit the response wave Pr after a lapse of a predetermined holding time from the reference time. Therefore, the responder 100 of the embodiment can preferably transmit the response wave Pr for the interrogation wave Pt from, for example, a specific responder 100 of a plurality of the responders.

Figure 5:
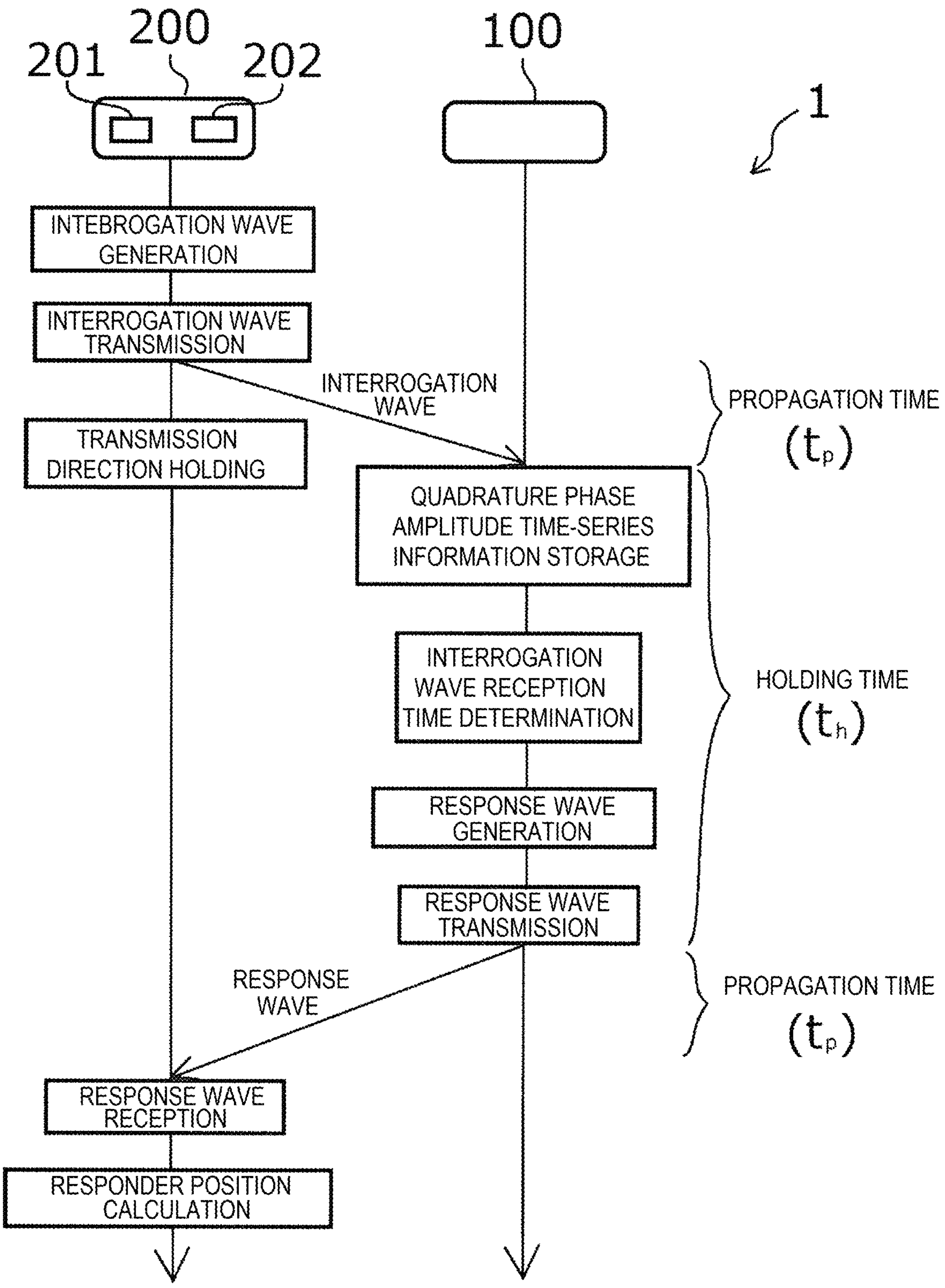
FIG. 5 is a flowchart showing an operation flow of one embodiment of a positioning system including the responder in FIG. 2.

Next, one embodiment of a positioning system 1 using the responder 100 of the embodiment will be described with reference to FIG. 5. In the positioning system 1 of the embodiment, the interrogator 200 modulates a signal containing the identification number of the responder 100 as a target by a predetermined method, generates and transmits an interrogation wave Pt to the responder 100.

Similarly to the responder 100 of the embodiment, the interrogator 200 of the positioning system 1 of the embodiment generates a directional wave using an array antenna in which a plurality of antennas 101 are arranged at predetermined intervals along the receiving surface of the responder 100. When the position of a desired responder 100 is unknown, the interrogator 200 preferably scans in the direction of the directional wave and holds information in the direction at the time when the response wave Pr is returned.

In the responder 100, the quadrature phase amplitude of the interrogation wave Pt is stored in the memory 102 as time-series information by the above described operation. When necessary, noise generated in the process of correcting, adding, or transmitting and receiving information in the memory 102 may be removed prior to the transmission of the response wave Pr. When detecting the identification number of its own, the responder 100 transmits the response wave Pr by reading out the quadrature phase amplitudes from the memory 102 in a direction opposite to the chronological order of the time-series information. The operation is performed so that the holding time $t_h$ is from the reception completion time of the interrogation wave Pt to the transmission start time of the response wave Pr. However, a delay function may be added as necessary.

In the positioning system 1 of the embodiment, the interrogator 200 is provided with a distance calculator 201 calculating a distance from the interrogator 200 to the responder 100, and a position detector 202 measuring the position of the responder 100. The location where the distance calculator 201 and the position detector 202 are provided is not particularly limited, and the units may be provided in the responder 100, or may be provided in another location than those of the interrogator 200 and the responder 100. When the reception completion of the response wave Pr is determined, the interrogator 200 calculates a propagation time $t_p$ from the transmission completion time of the interrogation wave Pt, the reception start time of the response wave Pr, and the holding time $t_h$, and calculates a distance from the interrogator 200 to the responder 100. The position of the responder 100 is calculated from the transmission direction of the interrogation wave Pt and the distance from the interrogator 200 to the responder 100. When both the interrogator 200 and the responder 100 are stopped, the propagation time $t_p$ of the interrogation wave Pt is equal to the propagation time $t_p$ of the response wave Pr.

As described above, the positioning system 1 of the embodiment includes the above described responder 100, interrogator 200, distance calculator 201 calculating the distance from the interrogator 200 to the responder 100, and position detector 202 measuring the position of the responder 100. Here, the interrogator 200 outputs the interrogation wave Pt containing a specific signal pattern including an identification number or the like. Further, the distance calculator 201 calculates the distance from the interrogator 200 to the responder 100 based on the difference between the time when the interrogation wave Pt is transmitted from the interrogator 200 and the time when the response wave Pr transmitted from the responder 100 is received by the interrogator 200 and the predetermined holding time $t_h$. The position detector 202 measures the position of the responder 100 based on the distance.

The positioning system 1 of the embodiment having the configuration can accurately measure the position of the responder 100. In a case where there are a plurality of interrogators 200, the position of the responder 100 can be measured by the plurality of interrogators 200 even when the interrogators 200 do not have directionality. In a case where there is one interrogator 200, when the interrogator 200 has directionality, the position of the responder 100 can be measured. Furthermore, even when there is only one interrogator 200 and the interrogator 200 does not have directionality, in a case where the movement direction of the responder 100 is only one direction, the position of the responder 100 can be measured.

Figure 6:
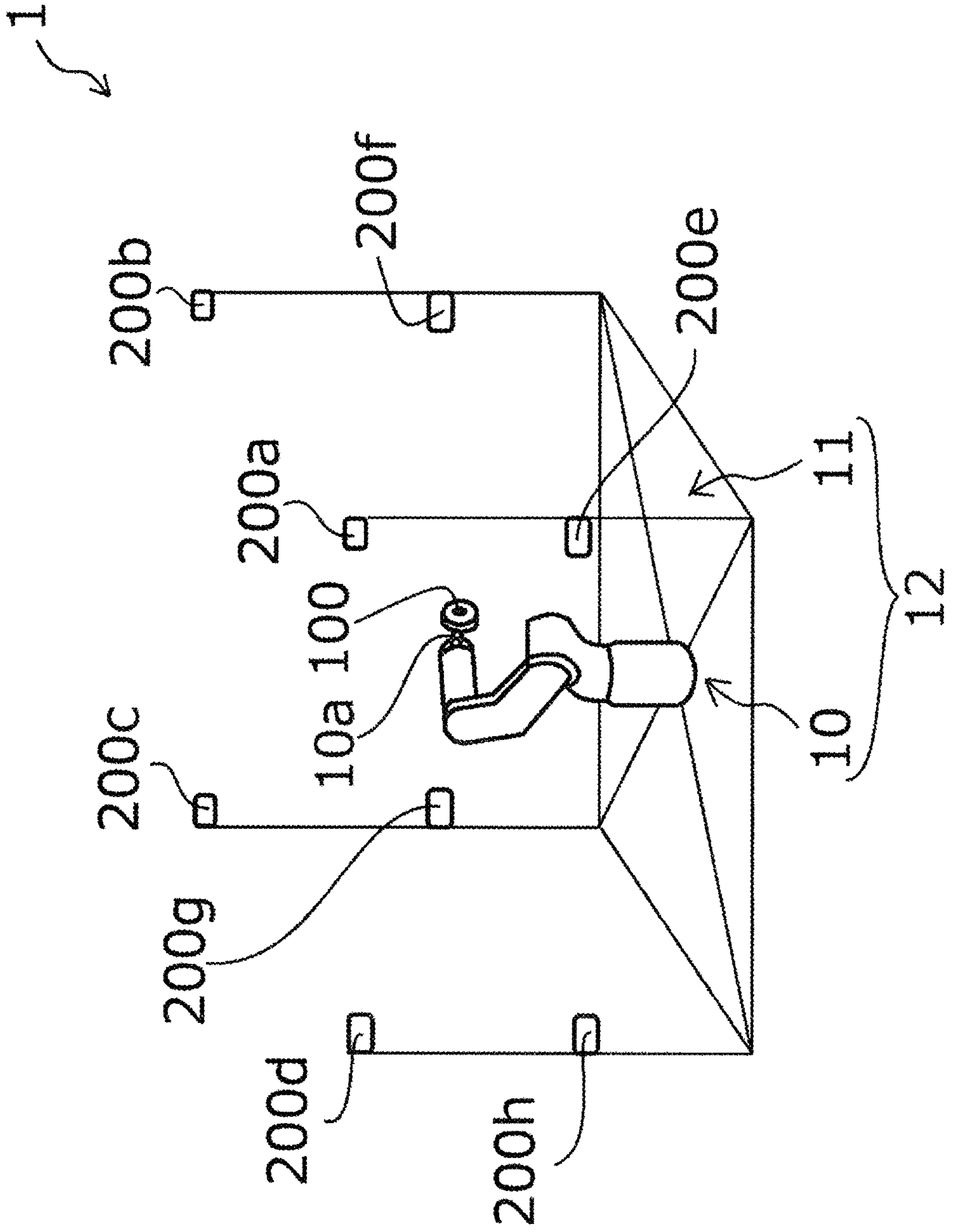
FIG. 6 shows a configuration of a robot arm as one embodiment of the positioning system including the responder in FIG. 2.

Next, one embodiment of another positioning system 1, other than the positioning system 1 shown in FIG. 5, using the responder 100 of the embodiment will be described with reference to FIG. 6. In the embodiment, an articulated robot 10 is installed in a center part of the positioning system 1, and the responder 100 is attached to an arm end portion 10*a*. Note that a control device (not shown) is incorporated in the articulated robot 10, and the position of the responder 100 is calculated from the distance to the responder 100 measured by communication with eight interrogators 200 (an interrogator 200*a*, an interrogator 200*b*, an interrogator 200*c*, an interrogator 200*d*, an interrogator 200*e*, an interrogator 200*f*, an interrogator 200*g*, and an interrogator 200*h*) in a multipoint positioning manner. In the embodiment, each interrogator 200 and the control device are electrically coupled by wired communication, but may be coupled by wireless communication.

The interrogator 200*a*, the interrogator 200*b*, the interrogator 200*c*, the interrogator 200*d*, the interrogator 200*e*, the interrogator 200*f*, the interrogator 200*g*, and the interrogator 200*h* are arranged around the articulated robot 10, have functions of returning the response waves Pr equivalent to those of the responder 100, and can measure the distance between the interrogators 200. The distance information between the interrogators 200 is aggregated in the control device in advance, and thereby, an absolute coordinate system in the positioning system 1 can be set and the position coordinates of all the interrogators 200 can be calculated.

Since the interrogator 200 can also measure the distance from the responder 100, the position of the responder 100 can also be calculated in the absolute coordinate system. Here, the eight interrogators 200 are provided, however, for measurement of the three-dimensional position of the responder 100, unknown variables in three axial directions orthogonal to one another may be obtained. Accordingly, when all the interrogators 200 are not on the same plane, the position of the responder 100 can be calculated with at least four interrogators 200. When all the interrogators 200 are provided outside the movement range of the responder 100, the position of the responder 100 can be calculated by the three interrogators 200.

In the positioning system 1 of the embodiment, an appropriate interrogator 200 can be selected according to the situation of wireless communication. The responder 100 is attached to a joint portion other than the arm end portion 10*a*, and thereby, the position and the motion of the joint and the arm of the articulated robot 10 can be measured. In a use scene for a workpiece, the responder 100 is attached to a tray on which the workpiece is placed, and thereby, the position of the workpiece can be measured. Further, the responder 100 is controlled to track the transmission direction of the interrogation wave Pt simultaneously with the operation of the respective motors within the articulated robot 10 and the transport mechanism of workpiece trays based on the information relating to the positions, and thereby, interlocking of a plurality of mechanisms can be controlled.

The positioning in the above described absolute coordinate system is also effective for setting of an initial position necessary before the activation of the articulated robot 10, that is, for teaching. In the articulated robot 10 of related art, an encoder is provided in each joint portion to detect the rotation direction of the joint and the arm and the final coordinates of the arm end portion 10*a* are estimated. When the number of joints increases, measurement errors of the encoders are accumulated, and further, deflection due to their own weights of the arm and the joint portions is caused. Accordingly, a large deviation from the actual position of the arm end portion 10*a* may be caused. In order to improve this, it is necessary to increase rigidity of the arm itself and a holding force of a reducer. On the other hand, the positioning system 1 of the embodiment is used, and thereby, even when the initial state of each encoder or the like is unknown, for example, the state of the articulated robot 10 can be grasped by attachment of the responders 100 to the respective portions of the articulated robot 10, transmission of the interrogation wave Pt from the interrogator 200, and measurement of the positions of the responders 100.

The positioning system 1 of the embodiment is explained in another expression. As shown in FIG. 6, the positioning system 1 of the embodiment includes a mechanical body 12 having the articulated robot 10 as a movable part having the arm, the joint portion, and the like, and a fixed part 11 onto which the articulated robot 10 is installed. The interrogators 200 are provided in the fixed part 11, and the responder 100 is provided in the arm end portion 10*a* of the articulated robot 10 as the movable part. The positioning system 1 of the embodiment having the configuration can accurately measure the position of the responder 100 provided in the movable part. However, not limited to the configuration, but, for example, the responder 100 may be provided in the fixed part 11 and the interrogator 200 may be provided in the movable part according to the apparatus configuration of the mechanical body 12 or the like.

The present disclosure is not limited to the above described examples and can be implemented in various configurations without departing from the gist of the present disclosure. In order to solve a part or all of the above described problems, or to achieve a part or all of the above described effects, technical features in the embodiments corresponding to the technical features in the respective aspects described in SUMMARY can be replaced or combined as appropriate. Unless the technical features are explained as essential technical features in the specification, the technical features can be deleted as appropriate. For example, in place of the array antenna including the plurality of antennas, one antenna having directionality such as a parabolic antenna may be provided. Note that the present disclosure can be applied to control of an automated guided vehicle in a factory, automated driving, and the like.

What is claimed is:

1. A responder that receives an interrogation wave from an interrogator and transmits a response wave to the interrogator, comprising:

at least one antenna receiving the interrogation wave;

a time-series information converter measuring a quadrature phase amplitude of the interrogation wave received by the at least one antenna and converting the quadrature phase amplitude into time-series information;

a memory storing the time-series information; and a transmission controller controlling to transmit the response wave from the at least one antenna based on the time-series information stored in the memory, wherein the transmission controller reads out the time-series information in an order reverse to an order of the storage in the memory and generates the response wave.

2. The responder according to claim 1, further comprising a reception time calculator determining a reference time as a time when the at least one antenna receives a specific signal pattern contained in the interrogation wave based on the time-series information stored in the memory, wherein the transmission controller controls to transmit the response wave after a lapse of a predetermined holding time from the reference time.

3. The responder according to claim 1, further comprising a plurality of antennas, wherein the plurality of antennas are arranged at predetermined intervals along a receiving surface of the responder.

4. The responder according to claim 1, wherein the time-series information converter includes:

a modem having a first bidirectional mixer, a second bidirectional mixer, and a bidirectional amplifier coupled to the at least one antenna, the first bidirectional mixer, and the second bidirectional mixer;

a reference signal generator having a shifter shifting a phase by $\pi/2$ and a local oscillator coupled to the first bidirectional mixer and coupled to the second bidirectional mixer via the shifter;

an A/D and D/A converter coupled to the first bidirectional mixer and the second bidirectional mixer; and a frequency divider coupled to the A/D and D/A converter.

5. A positioning system comprising:

the responder according to claim 1;

the interrogator;

a distance calculator calculating a distance from the interrogator to the responder; and a position detector measuring a position of the responder, wherein the interrogator outputs the interrogation wave containing a specific signal pattern, the distance calculator calculates the distance from the interrogator to the responder based on a difference between a time when the interrogation wave is transmitted from the interrogator and a time when the response wave transmitted from the responder is received by the interrogator and a predetermined holding time, and the position detector measures the position of the responder based on the distance.

6. The positioning system according to claim 5, further comprising a mechanical body having a movable part and a fixed part, wherein the interrogator is provided in the fixed part, and the responder is provided in the movable part.

* * * * *